(12) United States Patent
Yokota (10) Patent No.: US 6,437,289 B1
(45) Date of Patent: Aug. 20, 2002

(54) REFLOW SOLDERING APPARATUS (75) Inventor: Yatsuharu Yokota, Hachioji (JP)

(73) Assignee: Yokota Technica Limited Company, Tokyo (JP)

( * ) Notice: Subject to any disclaimer, the term of this patent is extended or adjusted under 35 U.S.C. 154(b) by 0 days.

(21) Appl. No.: 09/881,783

(22) Filed: Jun. 18, 2001

(30) Foreign Application Priority Data

Aug. 14, 2000 (JP) ........................................ 2000-245501
Sep. 14, 2000 (JP) ........................................ 2000-279533

(51) Int. Cl.[7] ........................... F27B 9/10; B23K 1/008; B23K 1/012
(52) U.S. Cl. .................... 219/388; 219/400; 228/180.21
(58) Field of Search ................................ 219/388, 400; 228/180.1–180.22

(56) References Cited

U.S. PATENT DOCUMENTS

| | | | | |
|---|---|---|---|---|
| 5,180,898 A | * | 1/1993 | Alden et al. ................. | 219/388 |
| 5,934,178 A | * | 8/1999 | Caridis et al. ............... | 219/388 |
| 6,005,224 A | * | 12/1999 | Wesseling et al. .......... | 219/388 |
| 6,049,066 A | * | 4/2000 | Wilson ......................... | 219/400 |
| 6,131,411 A | * | 10/2000 | Schnabel, Jr. ................ | 219/388 |
| 6,320,165 B1 | * | 11/2001 | Ovadia ......................... | 219/400 |
| 6,323,462 B1 | * | 11/2001 | Strand .......................... | 219/388 |

* cited by examiner

Primary Examiner—Joseph Pelham
(74) Attorney, Agent, or Firm—Armstrong, Westerman & Hattori, LLP (57) ABSTRACT

A reflow soldering apparatus using circulated heated gas to solder electronic components to a printed circuit board while transporting the printed circuit board mounted with electronic components on a conveyor chain. A plurality of gas passages for inflow of heated gas which have openings facing the circuit board, are provided at intervals in the transport direction of the conveyor chain. A first passage is provided for the flow of heated gas into the fan from an opening different from the opening for inflow and formed in the intermediate portion of the gas passage, and a second passage is provided for the flow of heated gas into the fan from openings formed on both ends of the gas passage.

14 Claims, 9 Drawing Sheets

REFLOW SOLDERING APPARATUS

BACKGROUND OF THE INVENTION

1. Field of the Invention

The present invention relates to a reflow soldering apparatus using circulated heated gas to solder electronic components to a circuit board while transporting the circuit board mounted with electronic components on a conveyor through a heating chamber.

2. Description of the Related Art

A reflow soldering apparatus is a device for heating a circuit board mounted with electronic components, melting the soldering paste and soldering the electronic components to the circuit board while the circuit board mounted with electronic components is transported by conveyor chain within a heated chamber.

A fan and a heater are installed in the reflow soldering apparatus to perform reflow soldering of the electronic components by heated gas. A reflow soldering apparatus of this type generally has a plurality of preheating chambers and one reflow soldering chamber arrayed along the transport direction of the conveyor chain. Each preheating chamber and reflow soldering chamber is installed with a fan and a heater. The fan and the heater are arranged above and below the conveyor chain. The gas heated by the heater is guided by a blow guidance means formed inside each chamber and blown onto the printed circuit board mounted with electronic components placed on the conveyor chain. The blow guidance means has a nozzle plate arranged horizontally and spaced apart from the printed circuit board on the conveyor chain. Heated gas from a plurality of nozzle holes formed in the nozzle plate is blown onto the printed circuit board mounted with electronic components.

The heated gas blown onto the edge section of the printed circuit board through the nozzle holes in the nozzle plate, heats the edge section of the printed circuit board and then flows to open spaces on the sides, so that gas heated to a specific temperature is constantly blown onto the edge section of the printed circuit board. However, after the heated gas blown onto the center section of the printed circuit board through the nozzle holes in the nozzle plate, heats the center section of the printed circuit board, this heated gas is not prone to flow to the open spaces on the sides, and tends to remain in that vicinity. As a result, a temperature difference occurs between the edge section of the printed circuit board and the center section of the printed circuit board, causing the problem of uneven distribution of heating temperatures.

SUMMARY OF THE INVENTION

In view of the above problems with the related art, the present invention has the object of providing a reflow soldering apparatus to render a smooth flow of heated gas so that the distribution of heating temperatures on the circuit board mounted with electronic components can be uniform.

To resolve the above mentioned problem with the related art, the present invention employs the following means. Namely, a reflow soldering apparatus using circulated heated gas to solder electronic components to a circuit board while transporting the circuit board mounted with electronic components on a conveyor through a heating chamber, comprises a plurality of gas passages formed at intervals along the transport direction of the conveyor, said gas passage having an opening for inflow of heated gas on the side facing the circuit board, and a first passage for the flow of heated gas into a blowing means from an opening different from the opening for inflow and formed in an intermediate portion of the gas passage.

The heated gas blown onto the circuit board mounted with electronic components, flows into the gas passage from the opening facing the circuit board side, and flows smoothly into the blowing means from the opening formed in the intermediate portion of the gas passage.

The present invention preferably has a second passage besides the first passage. In other words, the present invention preferably has a second passage for the flow of heated gas into the blowing means from an opening formed in an end portion of the gas passage.

In the present invention, after the heated gas blown onto the circuit board mounted with electronic components, flows into the gas passage from the opening facing the circuit board, besides flowing into the blowing means by way of the first passage, the heated gas also flows into the blowing means from the opening formed in the end portion of the gas passage, so that the heated gas is thus smoothly circulated.

The gas passage is for instance formed as a long, narrow passage intersecting the conveyor transport direction. The gas passage for blowing heated gas onto the circuit board is preferably provided between gas passages for inflow of heated gas and more preferably is formed between each of the gas passages for inflow of heated gas. In such cases, the gas passage for blowing heated gas onto the circuit board is for instance formed as a long, narrow passage transverse to the conveyor transport direction.

When the first passage and the second passage are provided, a structure in which the blowing means has intake openings on both opposite sides, and the heated gas flowing through the first passage is drawn into one of the intake openings, and the heated gas flowing through the second passage is drawn into the other intake opening, can provide smooth circulation of heated gas.

In that case, preferably a structure is provided where the blowing means has intake openings on the circuit board side and on the opposite side, and the heated gas flowing through the first passage from the opening formed in the intermediate portion of the gas passage is drawn into the intake opening provided on the circuit board side of the blowing means, and the heated gas passing through the second passage from the opening formed in the end portion of the gas passage is drawn into the intake opening provided on the opposite side from the circuit board.

The blowing means having intake openings in both opposite sides, besides being constituted by one fan or blower, may also be constituted by combining two fans or two blowers.

The blowing means preferably has intake openings on two sides as described above, but may also have an intake opening on one side.

In that case, when the first passage is present, a structure is preferably provided where the blowing means has an intake opening on the circuit board side, and the heated gas flowing through the first passage from the opening formed in the intermediate portion of the gas passage is drawn into the intake opening of the blowing means.

Further, when the first passage and the second passage are present, a structure is preferably provided where the blowing means has an intake opening on the circuit board side, and the heated gas flowing through the first passage from the opening formed in the intermediate portion of the gas passage is drawn into the intake opening of the blowing means, and the heated gas passing through the second passage from the opening formed in the end portion of the gas passage is drawn into the intake opening of the blowing means.

A fan or a blower is employed as the blowing means. A turbofan or a multiblade fan is for instance employed for the fan. When the fan has intake openings in both sides, the turbofan is preferable since the thickness of the fan can be decreased.

Air or nitrogen gas and the like is employed as the gas, however, nitrogen gas is preferable since oxidation is prevented.

BRIEF DESCRIPTION OF THE DRAWINGS

Preferred embodiments of the present invention will be described in detail based on the followings, wherein.

DESCRIPTION OF THE PREFERRED EMBODIMENTS

One preferred embodiment of the present invention is next described while referring to FIG. 1 through FIG. 7.

Figure 1:
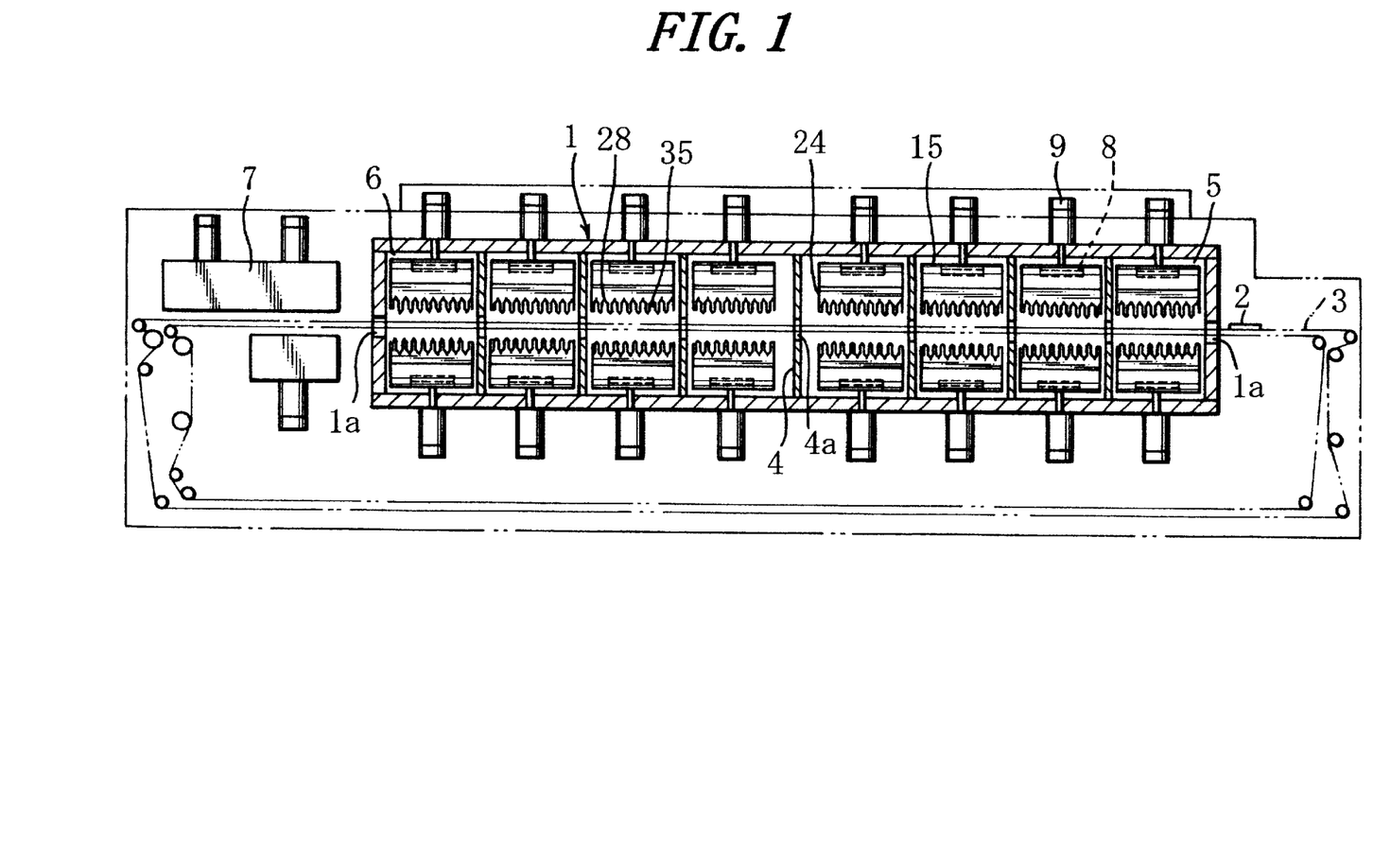
FIG. 1 is a vertical cross sectional view of the reflow soldering apparatus showing one preferred embodiment of the present invention.

A reflow soldering apparatus contains a long, narrow heating oven 1. The heating chamber inside the heating oven 1 is supplied with nitrogen gas to prevent oxidation of the solder and the electronic components. A printed circuit board 2 mounted with electronic components is transported into the heating chamber by a conveyor chain 3.

The heating chamber is divided by partition walls 4 into eight compartments, comprised of seven preheating chambers 5 and one reflow soldering chamber 6 arranged along the direction of transport. The preheating chambers 5 are compartments for gradually heating the printed circuit board 2 mounted with electronic components. The printed circuit board 2 mounted with electronic components is heated to approximately 150 degrees centigrade in these preheating chambers 5. The reflow soldering chamber 6 is a compartment for melting the soldering paste and soldering the electronic components. The printed circuit board 2 mounted with electronic components is heated to approximately 230 degrees centigrade in the reflow soldering chamber 6. Further, a cooling section 7 cools the printed circuit board 2 mounted with electronic components that have reached a high temperature after being soldered. The cooling section 7 is arranged to adjoin the heating oven 1.

The forward path of the conveyor chain 3 is arranged from the entrance side of the heating oven 1 through the heating oven 1, and extends horizontally to the cooling section 7 disposed adjacent to the exit of the heating oven 1, and the return path of the conveyor chain 3 is arranged below the heating oven 1. The reference numeral 1a denotes an opening formed in the entrance wall and exit wall of the heating oven 1. The reference number 4a denotes an opening formed in the partition wall 4. The printed circuit board 2 mounted with electronic components is loaded on the conveyor chain 3 at the entrance side of the heating oven 1, and after passing through the heating chamber, pass through the cooling section 7 and is withdrawn afterwards.

Heated gas circulating systems of the same structure are provided above and below the conveyor chain 3 in each chamber 5 and 6 of the heating oven 1. The following is explained on the heated gas circulating system on the upper side.

Figure 2:
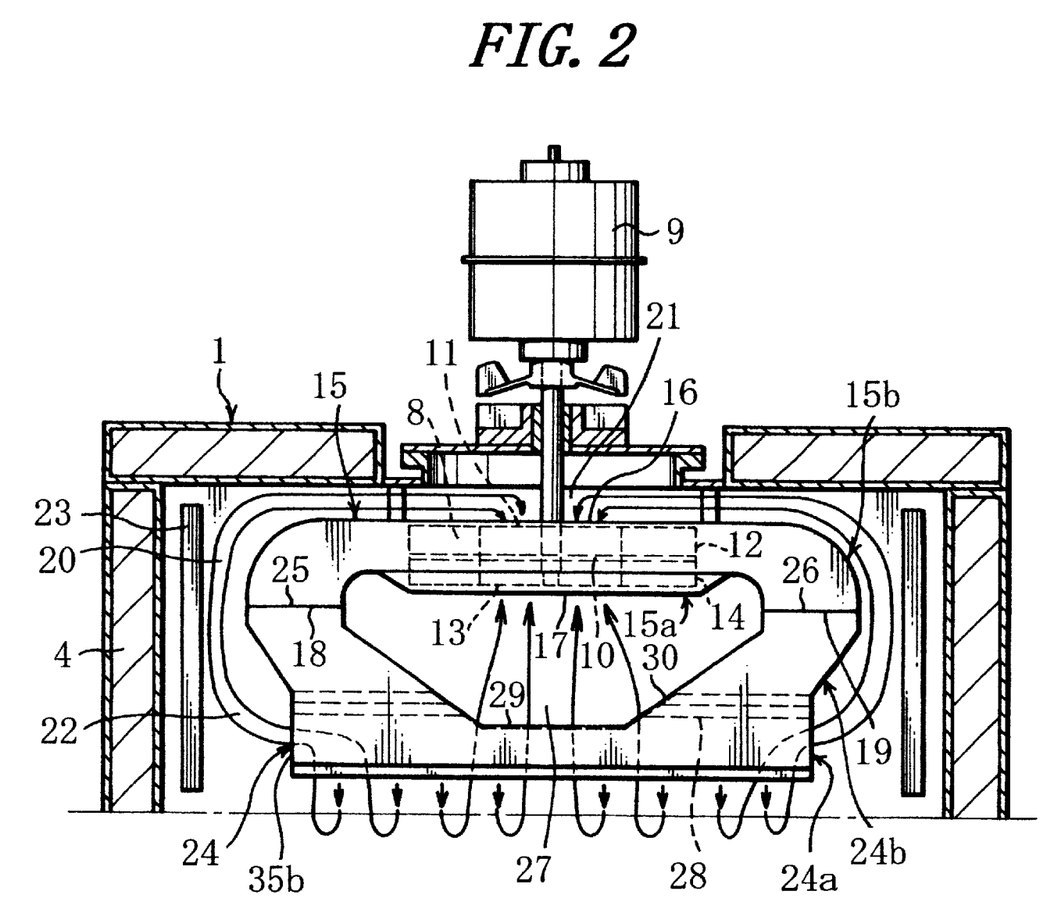
FIG. 2 is a vertical cross sectional view showing a portion of FIG. 1 cut at a right angle in the direction of transport.
Figure 3:
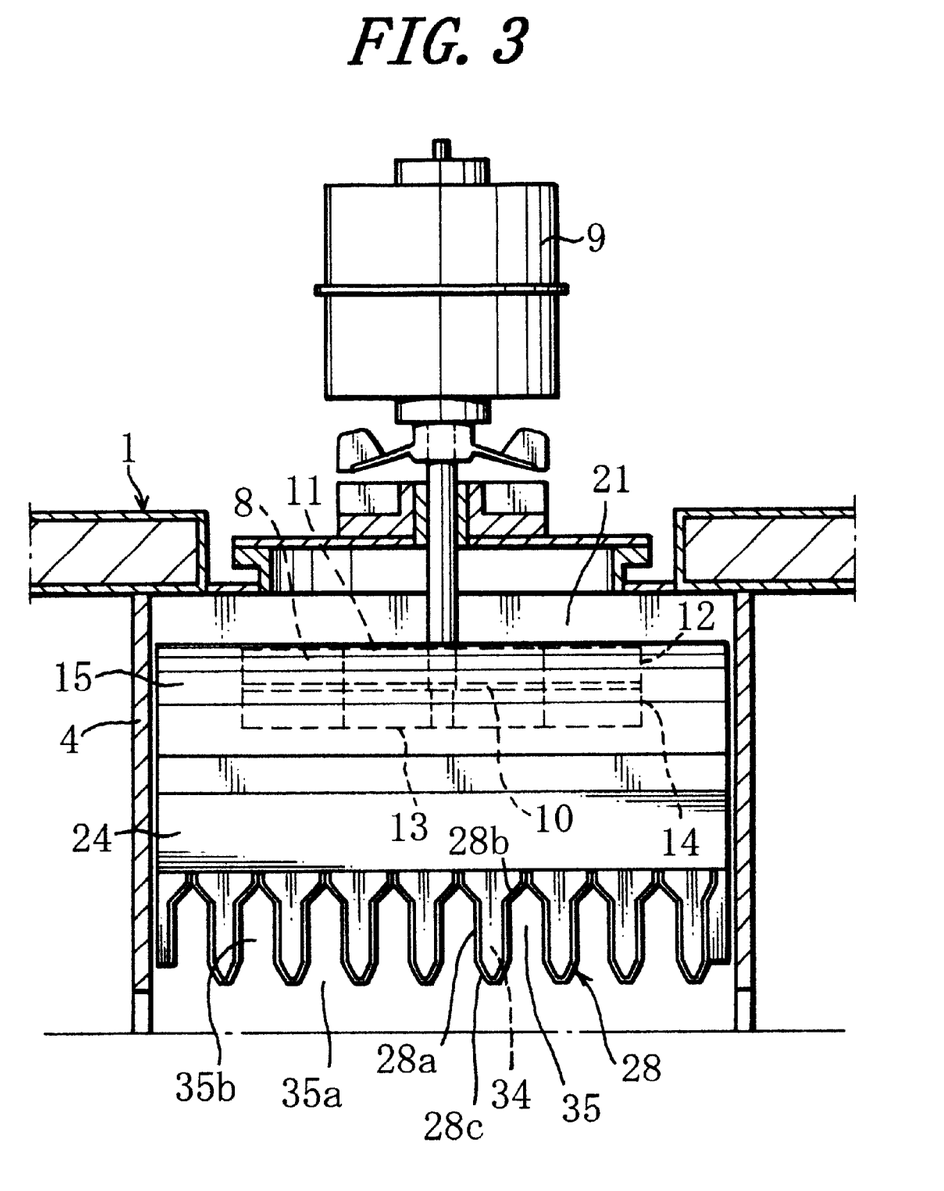
FIG. 3 is a vertical cross sectional view showing a portion of FIG. 1 cut along the direction of transport.
Figure 4:
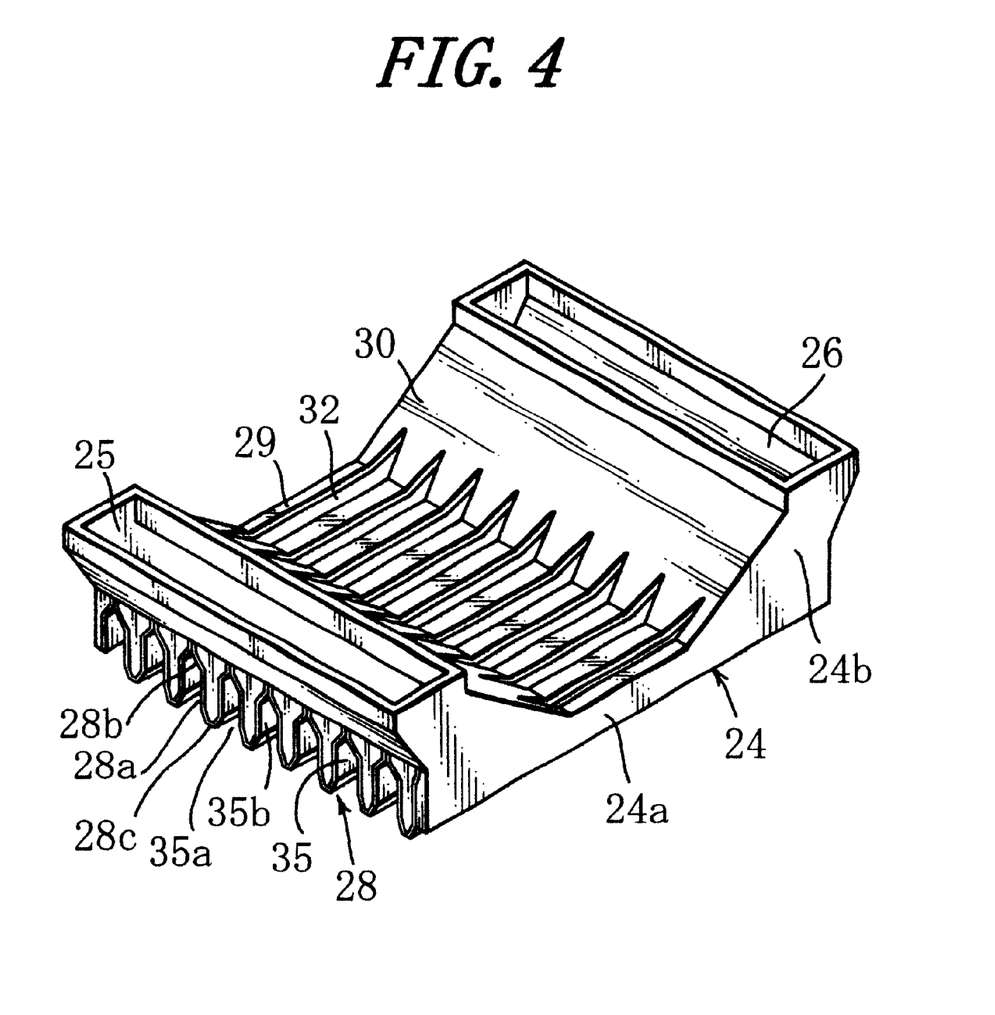
FIG. 4 is a perspective view showing the second casing portion as seen from the opposite side from the nozzle holes.

Fans 8 are respectively installed in the upper ends of the chambers 5 and 6 of the heating oven 1, and connected to motors 9 installed in the upper section outside of the heating oven 1. Each fan 8 has vanes above and below a steel plate 10, and has an intake opening 11 in the upper surface and a discharge opening 12 in the outer circumference, an intake opening 13 in the lower surface and a discharge opening 14 in the outer circumference. A multiblade fan or a turbofan is employed for the fan 8. In this embodiment, a turbofan is employed and is housed in a first casing 15.

The first casing 15 is comprised of a fan storage section 15a and a gas guide section 15b. The fan storage section 15a houses the fan 8, and has intake openings 16 and 17 in the upper and lower surfaces facing the intake openings 11 and 13 of the fan 8. The gas guide section 15b projects outwards on the left and right from the left and right openings of the fan storage section 15a, and curves downwards and has connecting openings 18 and 19 facing downwards. The first casing 15 is a rectangle as seen from a plan view and has almost no gap with the partition wall 4, but spaces 20 are present between the first casing 15 and the left and right sides of each chamber 5 and 6, and further, since the first casing 15 is located below the upper surface of each chamber 5 and 6, a space 21 is present between the first casing 15 and the upper surface of each chamber 5 and 6. A heater 23 is installed in the space 20 on the side of the first casing 15 and a space 22 below. There are no particular restrictions on the type of heater 23 but a sheath heater is used in this embodiment.

A second casing 24 is installed below the first casing 15. The second casing 24 stores the gas passage forming member. In this embodiment, the second casing 24 is comprised of a storage section 24 of a gas passage forming member and a gas guide section 24b. The storage section 24a of a gas passage forming member is a rectangular case as seen from a plan view and is open on the bottom. The gas guide section 24b extends upwards from the openings formed in the upper surface on the right and left ends of the storage section 24a of a gas passage forming member, and has connecting openings 25 and 26 facing upwards. The connecting openings 18 and 19 of the first casing 15 connect to the connecting openings 25 and 26. The second casing 24 has almost no gap with the partition wall 4, but the spaces 22 are present between the second casing 24 and the right and left sides of each chamber 5 and 6.

The gas passage forming member 28 is stored in the second casing 24. The gas passage forming member 28 is formed of plate member in a corrugated shape. The gas passage forming member 28 is comprised of an array of a plurality of vertical walls 28a placed at intervals in the direction of transport of the conveyor chain 3, and roof walls 28b with generally inverse V-shaped cross section which connect to the upper edges of the adjoining vertical walls 28a, and nozzle forming walls 28c with generally V-shaped cross section which connect to the lower edges of the adjoining vertical walls 28a. The roof wall 28b and nozzle forming wall 28c are alternately formed in the transport direction of the conveyor chain 3. The gas passage forming member 28 is stored and fixed inside the second casing 24 in such a way that the upper edge is positioned slightly upward from a level upper surface 29 of the intermediate portion of the second casing 24. The intermediate portion of the gas passage forming member 28 is therefore notched from the roof wall 28b to the upper edge of the vertical wall 28a, to match the level upper surface 29 of the intermediate portion of the second casing 24 and tilted surfaces 30 of the gas guide section 24b, and the gas passage forming member 28 is formed with a plurality of long, narrow openings 31. The second casing 24 is also formed with a plurality of long, narrow openings 32 of the same shape adjoining the plurality of long, narrow openings 31.

Figure 5:
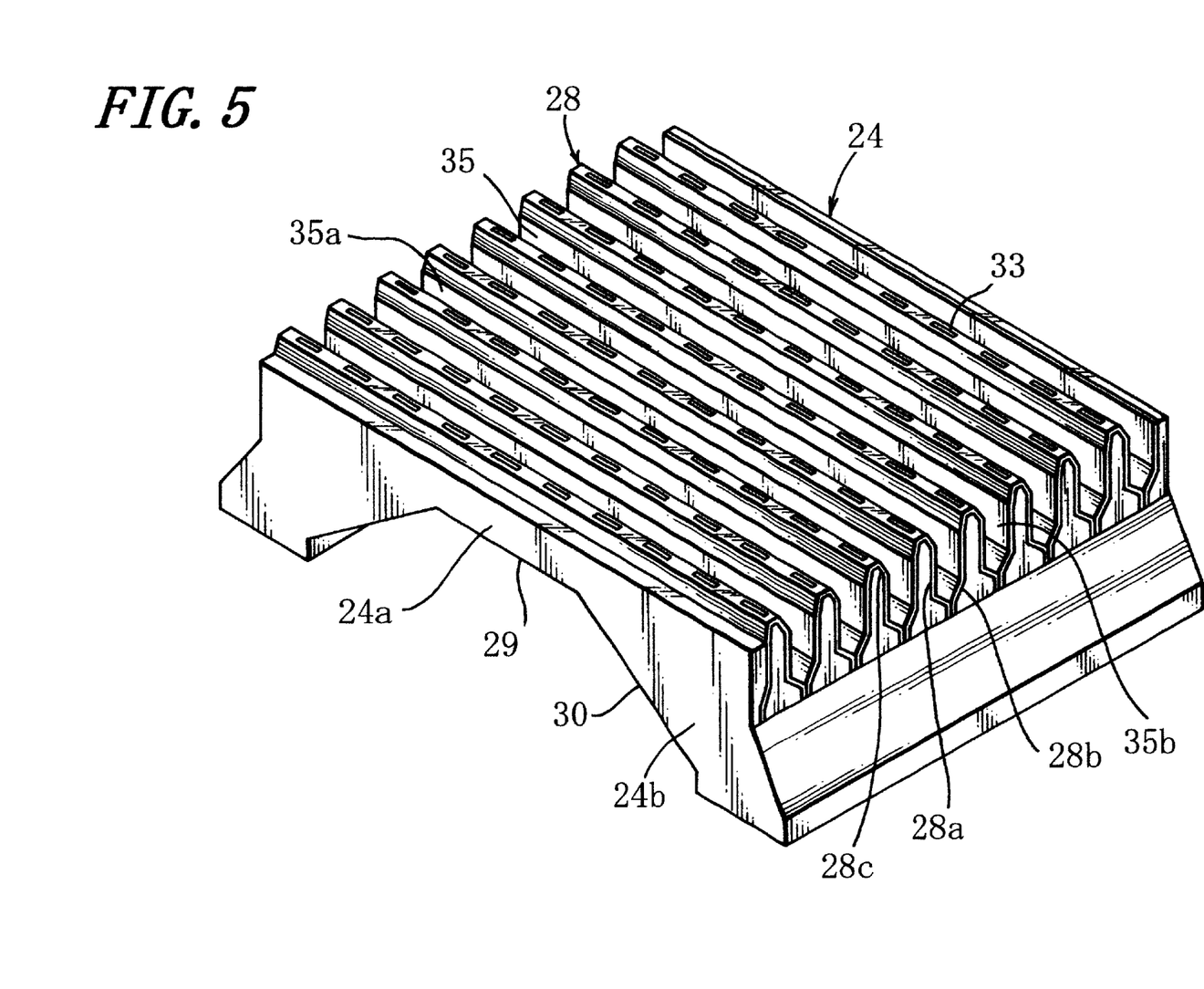
FIG. 5 is a perspective view showing the second casing portion as seen from the nozzle holes side.
Figure 6A:
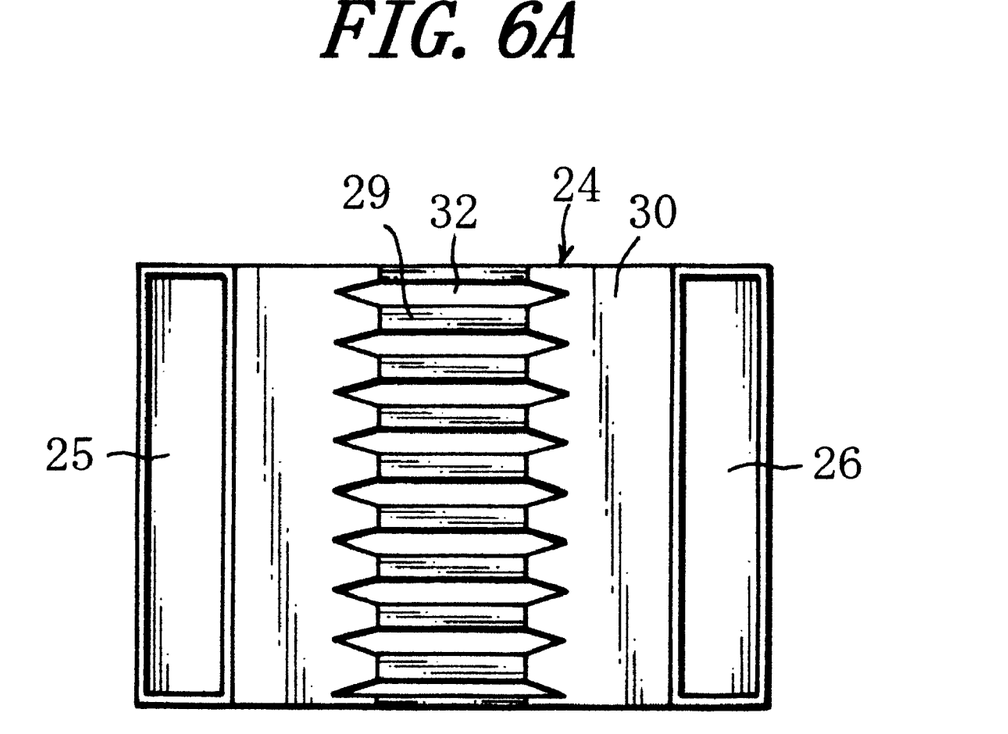
FIG. 6A is a plan view showing the second casing portion.
Figure 6B:
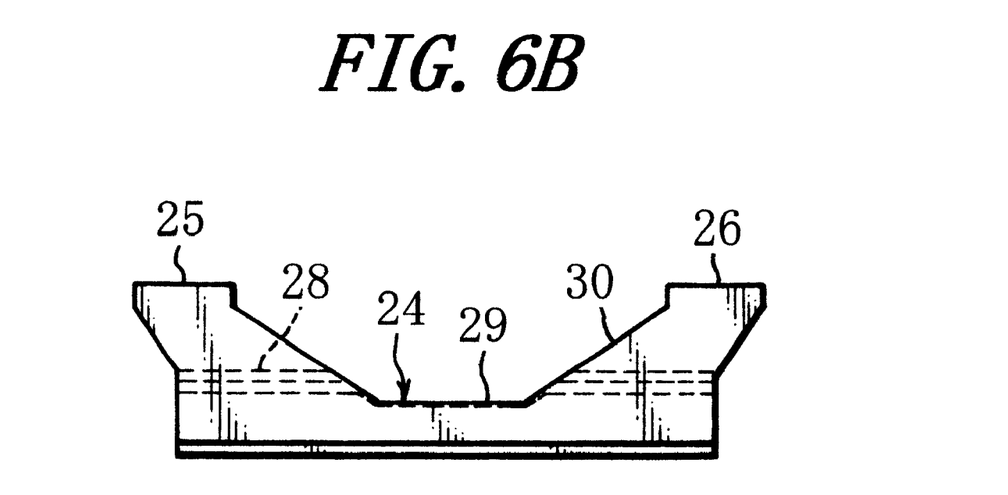
FIG. 6B is a front view showing the second casing portion.
Figure 7:
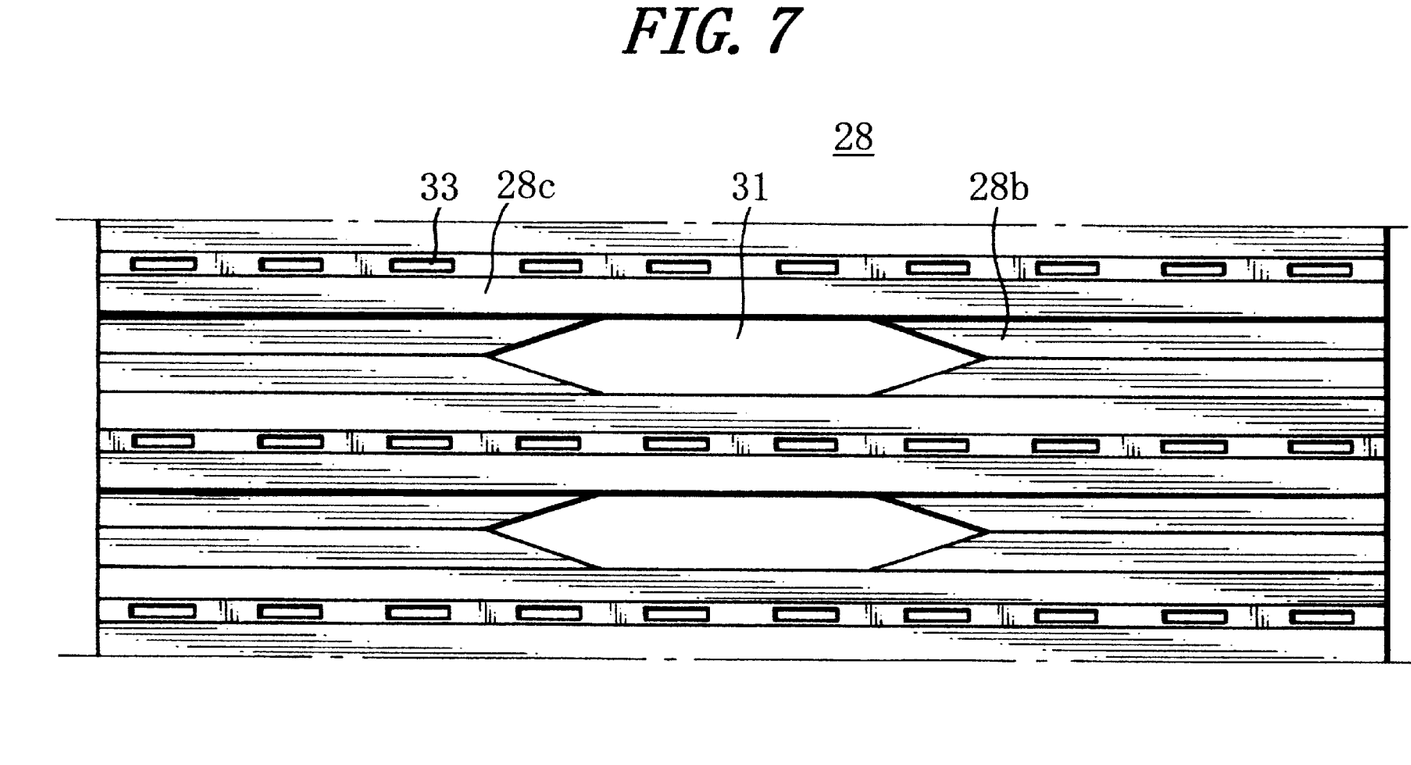
FIG. 7 is an enlarged view showing a portion of the end surface of the nozzle holes side of the gas passage forming member.

A plurality of nozzle holes 33 are formed at intervals in the longitudinal direction in the bottom surface of the nozzle forming wall 28c. A long, narrow space which is formed by the vertical walls 28a and the nozzle forming wall 28c of the gas passage forming member 28 forms a gas passage 34 for blowing heated gas onto the printed circuit board 2 mounted with electronic components. A long, narrow space which is formed by the vertical walls 28a and the roof wall 28b of the gas passage forming member 28 forms a gas passage 35 for inflow of the heated gas. The gas passage forming member 28 extends to the left and right sides of the second casing 24 and forms the lower fringe of the side surface of the second casing 24, the left and right ends of the gas passage 34 for blowing the heated gas onto the printed circuit board 2 are sealed off, and the left and right ends of the gas passage 35 for inflow of the heated gas are open.

The heated gas circulating system above the conveyor chain 3 was described, however, the heated gas circulating system below the conveyor chain 3 is configured in the same way.

The function of the invention is described next.

The printed circuit board 2 mounted with electronic components is loaded onto the conveyor chain 3 at the entrance to the heating oven 1, and transported into the heating chamber by the conveyor chain 3. In the reflow soldering chamber 6 and the preheating chamber 5, each fan 8 is rotated by the motor 9.

The following is explained based on the heated gas circulating system in the upper portion.

The heated gas from the fan 8 flows through the gas guide section 15b of the first casing 15 and enters the second casing 24 from the left and right connecting openings 18 and 19. The heated gas which entered the second casing 24 through the gas guide section 24 is blown onto the printed circuit board 2 mounted with electronic components on the conveyor chain 3, from the nozzle holes 33 of the gas passages 34.

After the heated gas blown onto the printed circuit board 2 mounted with electronic components has heated the printed circuit board 2 with electronic components, the heated gas flows into the gas passages 35 from the openings 35a facing the printed circuit board 2. The heated gas that has flown into the gas passages 35, besides passing through the first passage and being drawn into the intake opening 13 on the lower surface of the fan 8, passes through the second passage and is drawn into the intake opening 11 on the upper surface of the fan 8. In other words, in this embodiment, the heated gas that flowed into the gas passages 35, passes through the openings 31 formed in the intermediate portion longitudinally in the gas passages 35 and the openings 32 of the second casing 24, and flows out into the space 27 below the fan 8, and is drawn into the intake opening 13 on the lower side of the fan 8. The heated gas flowing into the gas passages 35 on the other hand, flows out to the spaces 22 from the openings 35b formed on both ends of the gas passages 35, passes through the spaces 20 while being heated by the heater 23 and enters the space 21 above the first casing 15, and is drawn into the intake opening 11 on the upper side of the fan 8.

The heated gas from the fan 8 then enters the second casing 24 through the gas guide section 15 of the first casing 15, and is blown from the nozzle holes 33 onto the printed circuit board 2 mounted with electronic components to heat the printed circuit board 2 mounted with electronic components.

The heated gas circulating system on the upper side was described above, however the heated gas circulating system on the lower side has the same effect.

The heated gas as described above can heat the printed circuit board 2 mounted with electronic components without the heated gas remaining at a point and can circulate smoothly, so that the heating temperatures are uniformly distributed on the printed circuit board 2 mounted with electronic components.

The printed circuit board 2 mounted with electronic components is in this way gradually heated in the preheating chambers 5, the soldering paste is melted in the reflow soldering chamber 6 and the electronic components on the printed circuit board 2 is soldered satisfactorily. The printed circuit board 2 mounted with electronic components is then transported out of the heating oven 1, its temperature gradually is lowered in the cooling section 7, and the printed circuit board 2 mounted with electronic components is then withdrawn.

Figure 8:
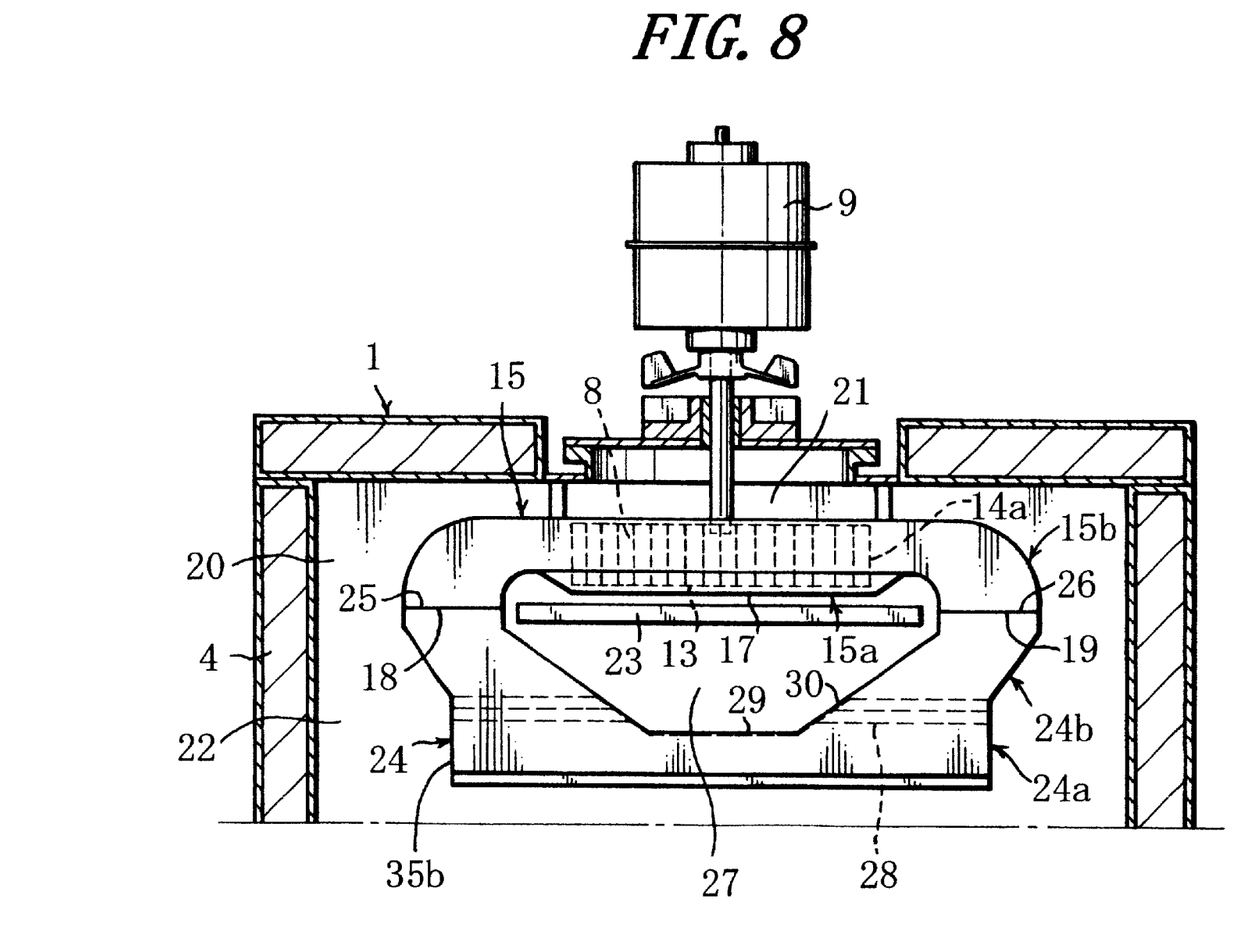
FIG. 8 is a view corresponding to FIG. 2, showing another preferred embodiment of the present invention.

Another preferred embodiment of the present invention is shown in FIG. 8. The structures of the fan and heater are different from the above embodiment, however other sections have the same as the structure of the above embodiment.

The fan 8 of this embodiment is a multiblade fan having an intake opening 13 only in the lower surface and a discharge opening 14a in the outer circumference. The heater 23 is installed in the space 27 below the fan 8.

Therefore, in explaining the function of this embodiment based on the heated gas circulating system on the upper side, the fan 8 draws in heated gas from the intake opening 13 on the lower surface, and as described in the above embodiment, the heated gas enters the second casing 24 from the first casing 15, and heated gas is blown onto the printed circuit board 2 mounted with electronic components, from the nozzle holes 33 of the gas passages 34.

After the heated gas has been blown onto and heated the printed circuit board 2 mounted with electronic components, the heated gas flows into the gas passages 35 from the openings 35a facing the printed circuit board 2. The heated gas that flowed into the gas passages 35, then passes through the first passage and is drawn into the intake opening 13 on the lower surface of the fan 8. In other words, the heated gas that has flowed into the gas passages 35, then passes through the openings 31 provided in the intermediate portion longitudinally in the gas passages 35 and the openings 32 of the second casing 24, flows out to the space 27 below the fan 8, and is drawn into the intake opening 13 on the lower surface of the fan 8.

The heated gas from the fan 8 then enters the second casing 24 through the gas guide section 15b of the first casing 15, and blown onto the printed circuit board 2 mounted with electronic components from the nozzle holes 33 to heat the printed circuit board 2 mounted with electronic components.

The heated gas circulating system on the upper side was described above, however the heated gas circulating system on the lower side has the same effect.

In the above embodiment, the heated gas as described above can heat the printed circuit board 2 without the heated gas remaining at certain points and can circulate smoothly, so that the heating temperatures are uniformly distributed on the printed circuit board 2 mounted with electronic components.

Figure 9:
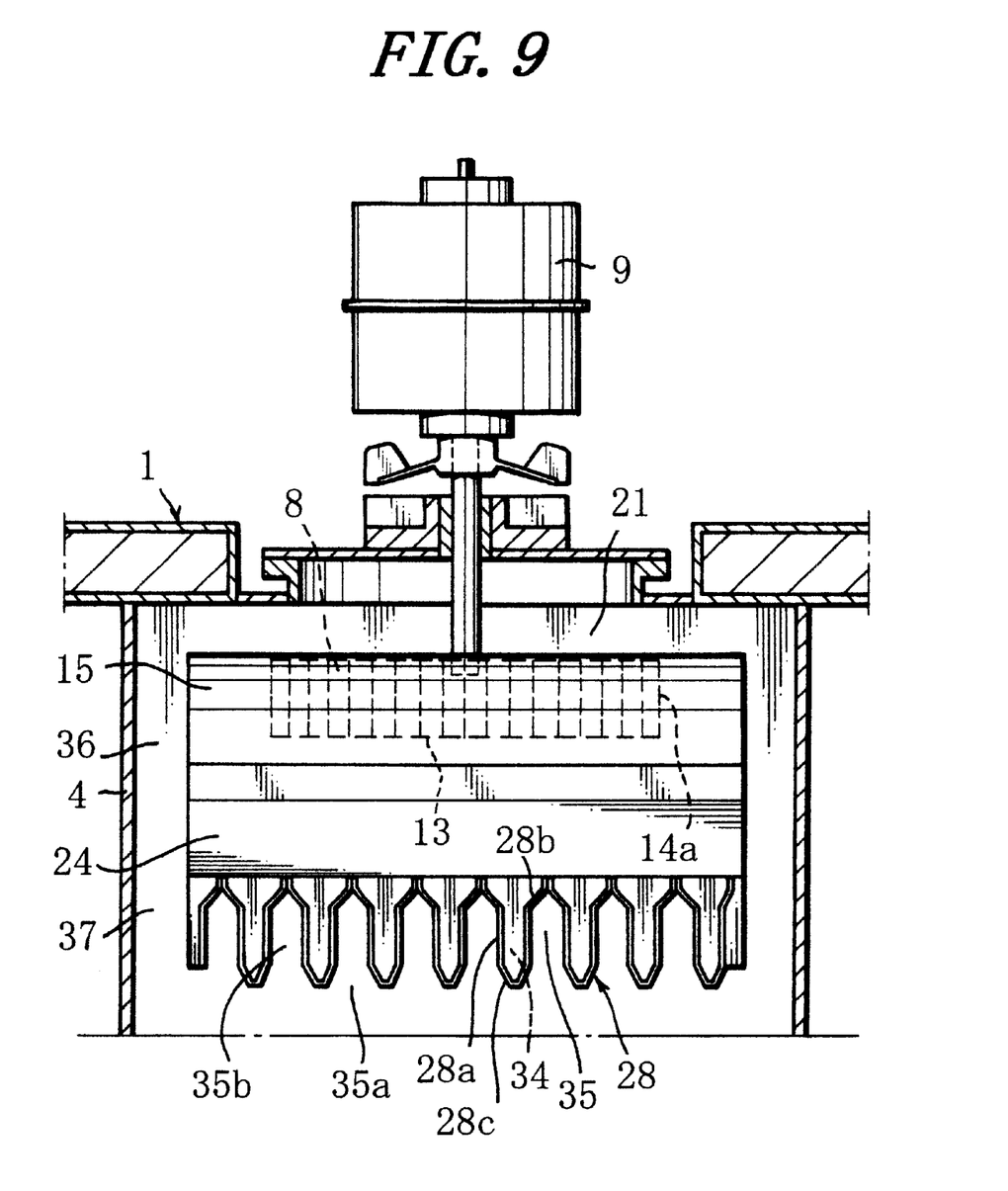
FIG. 9 is a view corresponding to FIG. 3, showing still another preferred embodiment of the present invention.

Still another preferred embodiment of the present invention is shown in FIG. 9. This embodiment differs from the embodiment described in FIG. 8 in the point that after heating the circuit board, the heated gas is drawn into the fan 8 by the second passage, as well as the first passage. Other sections have the same as the structure of the embodiment described in FIG. 8.

In this embodiment, spaces 36 and 37 are respectively formed between the first casing 15, second casing 24, and the left and right sides of each chamber 5 and 6.

Therefore, in explaining the function of this embodiment based on the heated gas circulating system on the upper side, the fan 8 draws the heated gas from the intake opening 13 on the lower side, as described in the above embodiment, the heated gas enters the second casing 24 from the first casing 15, and is blown from the nozzle holes 33 of the gas passages 34 onto the printed circuit board 2 mounted with electronic components, loaded onto the conveyor chain 3.

After the heated gas has been blown onto and heated the printed circuit board 2 mounted with electronic components, the heated gas flows into the gas passages 35 from the openings 35a facing the printed circuit board 2. The heated gas that flowed into the gas passages 35, as described above, then passes through the first passage and is drawn into the intake opening 13 on the lower surface of the fan 8. Then, in this embodiment, the heated gas that has flowed into the gas passages 35, further flows through the second passage and is drawn into the intake opening 13 on the lower surface of the fan 8. In other words, the heated gas that flowed into the gas passages 35, flows out into the spaces 22 from the openings 35b formed on both ends of the gas passages 35, and enters the space 27 below the fan 8 from the spaces 36 and 37 formed between the first casing 15, the second casing 24, and the left and right side surfaces of each chamber 5 and 6, and is drawn into the intake opening 13 on the lower surface of the fan 8.

The heated gas from the fan 8 then enters the second casing 24 from the gas guide section 15b of the first casing 15, and is blown onto the printed circuit board 2 mounted with electronic components from the nozzle holes 33 to heat the printed circuit board 2 mounted with electronic components.

The above description was based on the heated gas circulating system on the upper side, however the heated gas circulating system on the lower side also has the same effect.

In this embodiment, the heated gas as described above can heat the printed circuit board 2 mounted with electronic components without the heated gas remaining at certain points and can circulate smoothly, so that the heating temperatures are uniformly distributed on the printed circuit board 2 mounted with electronic components.

The above embodiments described a reflow soldering apparatus that performed soldering by means of circulated heated gas, needless to say however, the present invention can also be applied to a reflow soldering apparatus that uses heated gas and a far-infrared heater besides.

Although the present invention has been described with reference to the preferred embodiments, it is apparent that the present invention is not limited to the aforesaid preferred embodiments, but various modifications can be attained without departing from its scope.

What is claimed is:

1. A reflow soldering apparatus using circulated heated gas to solder electronic components to a circuit board while transporting said circuit board mounted with electronic components on a conveyor through a heating chamber, said reflow soldering apparatus comprising a plurality of gas passages formed at intervals along the transport direction of said conveyor, each said gas passage having an opening for inflow of heated gas on the side facing said circuit board, and a first passage for the flow of heated gas into a blowing means from an opening different from said opening for inflow and formed in an intermediate portion of said gas passage, wherein said reflow soldering apparatus has a second passage for the flow of heated gas into said blowing means from an opening formed in an end portion of said gas passage.

2. A reflow soldering apparatus according to claim 1, wherein said gas passage is a long, narrow passage transverse to the conveyor transport direction.

3. A reflow soldering apparatus according to claim 1, wherein a gas passage for blowing heated gas onto said circuit board is formed between said gas passages for inflow of heated gas.

4. A reflow soldering apparatus according to claim 1, wherein a gas passage for blowing heated gas onto said circuit board is formed between each of said gas passages for inflow of heated gas.

5. A reflow soldering apparatus according to claim 3, wherein said gas passage for blowing heated gas is a long, narrow passage transverse to the conveyor transport direction.

6. A reflow soldering apparatus according to claim 1, wherein said blowing means has intake openings on both opposite sides, and the heated gas flowing through said first passage is drawn into one of said intake openings, and the heated gas flowing through said second passage is drawn into the other intake opening.

7. A reflow soldering apparatus according to claim 1, wherein said blowing means has intake openings on said circuit board side and on the opposite side, and the heated gas flowing through said first passage from said opening formed in the intermediate portion of said gas passage is drawn into said intake opening provided on the circuit board side of said blowing means, and the heated gas passing through said second passage from said opening formed in the end portion of said gas passage is drawn into said intake opening provided on the opposite side from the circuit board.

8. A reflow soldering apparatus according to claim 1, wherein said blowing means has an intake opening on one side.

9. A reflow soldering apparatus according to claim 1, wherein said blowing means has an intake opening on a circuit board side, and the heated gas flowing through said first passage from said opening formed in the intermediate portion of said gas passage is drawn into said intake opening of said blowing means.

10. A reflow soldering apparatus according to claim 1, wherein said blowing means has an intake opening on said circuit board side, and the heated gas flowing through said first passage from said opening formed in the intermediate portion of said gas passage is drawn into said intake opening of said blowing means, and the heated gas passing through said second passage from said opening formed in the end portion of said gas passage is drawn into said intake opening of said blowing means.

11. A reflow soldering apparatus according to claim 1, wherein said blowing means is a fan or a blower.

12. A reflow soldering apparatus according to claim 11, wherein said fan is a turbofan or a multiblade fan.

13. A reflow soldering apparatus according to claim 1, wherein nitrogen gas is employed as said gas.

14. A reflow soldering apparatus according to claim 1, wherein air is employed as said gas.

* * * * *